(12) United States Patent
Krishnamurthy

(10) Patent No.: US 9,141,437 B2
(45) Date of Patent: Sep. 22, 2015

(54) METHODS AND SYSTEMS FOR MIGRATING NETWORK RESOURCES TO IMPROVE NETWORK UTILIZATION

(75) Inventor: Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1228 days.

(21) Appl. No.: 12/021,341

(22) Filed: Jan. 29, 2008

(65) Prior Publication Data

US 2009/0193122 A1    Jul. 30, 2009

(51) Int. Cl.
*G06F 15/173* (2006.01)
*G06F 9/50* (2006.01)
*G06F 9/52* (2006.01)

(52) U.S. Cl.
CPC .............. *G06F 9/5088* (2013.01); *G06F 9/526* (2013.01)

(58) Field of Classification Search
CPC ........ G06F 9/50; G06F 9/5088; G06F 9/5005
USPC ........................................................ 709/226
See application file for complete search history.

(56) References Cited

U.S. PATENT DOCUMENTS

| | | | |
|---|---|---|---|
| 5,339,427 A | 8/1994 | Elko et al. | |
| 5,537,645 A | 7/1996 | Henson et al. | |
| 6,496,871 B1 | 12/2002 | Jagannathan et al. | |
| 6,539,446 B1 | 3/2003 | Chan | |
| 6,615,373 B2 | 9/2003 | Elko et al. | |
| 6,950,853 B2 | 9/2005 | Garcia-Luna-Aceves et al. | |
| 6,970,872 B1 * | 11/2005 | Chandrasekaran et al. | 1/1 |
| 6,976,066 B1 | 12/2005 | Mouhanna et al. | |
| 7,028,300 B2 | 4/2006 | Goldick | |
| 2002/0049899 A1 | 4/2002 | Kenworthy | |
| 2005/0223005 A1 | 10/2005 | Shultz et al. | |
| 2006/0112297 A1 | 5/2006 | Davidson | |
| 2006/0136926 A1 | 6/2006 | Goldick | |
| 2006/0212573 A1 | 9/2006 | Loaiza et al. | |
| 2008/0126726 A1 * | 5/2008 | Cometto et al. | 711/163 |

FOREIGN PATENT DOCUMENTS

EP    0755004 B1    10/2001

OTHER PUBLICATIONS

Cisco Systems, Inc. Connectivity Distances for IBM Enterprise Environments Using The Cisco ONS 15500 Series Wavelength Division Multiplexers [Online], 2004 [retrieved on Oct. 25, 2009]. Retrieved from the Internet:<URL: http://www.cisco.mn/en/US/prod/collateral/optical/ps2011/prod_white_paper0900aecd8014c967.pdf>.*

* cited by examiner

*Primary Examiner* — Daniel C Murray
*Assistant Examiner* — Adam Cooney
(74) *Attorney, Agent, or Firm* — Scully, Scott, Murphy & Presser, P.C.; Steven Chiu, Esq.

(57) ABSTRACT

A method and system are disclosed for migrating network resources to improve network utilization, for use in a multi-node network wherein nodes of the network share network resources. The method comprises the steps of identifying a group of nodes that share one of the network resources, and identifying one of the nodes satisfying a specified condition based on at least one defined access latency metric. The shared resource is moved to the identified one of the nodes to reduce overall access latency to access the shared resource by said group of nodes. One embodiment of the invention provides a method and system to synchronize tasks in a distributed computation using network attached devices (NADs). A second embodiment of the invention provides a method and system to reduce lock latency and network traffic by migrating lock managers to coupling facility locations closest to nodes seeking resource access.

20 Claims, 8 Drawing Sheets

| RESOURCE ID ─402a | HOME SWITCH ADDRESS/ID ─402b | MOBILE SWITCH ADDRESS/ID ─402c |
|---|---|---|
| | | |

402

CLIENT RESOURCE INDIRECTION TABLE

| RESOURCE ID ─404a | OWNER ─404b | LOCK MANAGER LOCATION ─404c | LINKED LIST OF WAITING NODES ─404d |
|---|---|---|---|
| | | | |

404

HOME NAD RESOURCE MAPPING TABLE

FIG. 4

METHODS AND SYSTEMS FOR MIGRATING NETWORK RESOURCES TO IMPROVE NETWORK UTILIZATION

BACKGROUND OF THE INVENTION

1. Field of the Invention

This invention generally relates to computer networks, and more specifically, the invention relates to migrating network resources to improve network utilization. Even more specifically, the preferred embodiment of the invention relates to moving a compute resource, such as a lock manager, around the network with the intent, based on observed or predicted utilization, of reducing or minimizing the amount of network traffic consumed by accessing this resource.

2. Background Art

Multiple processes running on multi-processing systems may access "shared resources." Some of these shared resources may be accessed by only one process at a time, while others may be accessed concurrently by multiple processes. Consequently, "synchronization mechanisms" have been developed to control access by multiple processes to shared resources. The synchronization mechanism grants locks to processes. Locks grant to holders of the locks the right to access a particular resource in a particular way. Once a lock is granted to a process, the process holds or owns the lock until the lock is relinquished, revoked, or otherwise terminated. Locks are represented by data structures such as semaphores, read/write latches, and condition variables. There are many types of locks. Some types of locks allow shared resources to be shared by many processes concurrently (e.g. shared read lock), while other types of locks prevent any type of lock from being granted on the same resource (exclusive write lock).

The entity responsible for granting locks is referred to herein as a lock manager. In a single node multi-processing system, a lock manager is typically a software component executed and invoked by processes on the node accessing a shared resource. In contrast to a single node system, a multi-node system is comprised of a network of computing devices or nodes. Each node may be a multi-processing system, and may have a local lock manager to control access to resources of the node that may be shared with other nodes in the system. In these multi-node systems or networks, many nodes may access many other nodes for access to shared resources. Burdening compute nodes for low latency lock access can considerably affect network performance.

SUMMARY OF THE INVENTION

An object of this invention is to migrate network resources, in a multi-node computer network, to improve network utilization.

Another object of the present invention is to move a compute resource, such as a lock manager instance, around a computer network in order to reduce or minimize the amount of network traffic consumed by accessing this resource.

A further object of an embodiment of the invention is to synchronize tasks in a distributed computation using network attached devices.

An object of an embodiment of the invention is to reduce lock latency and network traffic, in a distributed, multi-node computer network, by migrating lock manager instances to coupling facility locations closest to the nodes seeking resource access.

These and other objectives are attained with a method and system for migrating network resources to improve network utilization. The method and system are for use in a multi-node network wherein nodes of the network share network resources. The method comprises the steps of identifying a group of nodes that share one of the network resources, and identifying one of the nodes satisfying a specified condition based on at least one defined access latency metric. An instance of the shared resource is moved to the identified one of the nodes to reduce overall access latency to access the shared resource by said group of nodes.

It may be noted that nodes are described herein as performing actions and as being the object of actions. However, this is just a convenient way of expressing that one or more processes on a node are performing an action or is the object of an action. For example, a node accessing a shared resource or granting, holding, or being issued a lock is just a convenient way of expressing that a process on the node is accessing a shared resource or granting, holding, or being issued a lock.

One embodiment of the invention provides a method and system to synchronize tasks in a distributed computation using network-attached devices (NADs). Each NAD has a processor, memory, storage and IP network link. The NADs are used to offload lock access and grant to a simple device externally attached to a switch or router node. In a multi-node computer network, there is usually temporal locality in resource usage, and for example, gang scheduled processes demonstrate such locality. Resources are usually shared among tasks, and these tasks might be distributed across a machine cluster. As an example, tasks T1, T2, T3, T4 on machines M1, M2, M3 and M4 access database records R1, R2, R3 and R4. T1 acquires a lock on R1, then R2, R3 and finally R4. T2, T3, T4 also compete for access to R1, R2, R3 and R4. A network-attached device can be used as a lock server or manager to offload lock request from the server machine. In one embodiment of the invention, a network device is used to offload lock management tasks from the resource owner compute node. In addition, if temporal locality in resource usage is detected, a lock manager thread may be migrated to a NAD location that is equidistant from all participating compute nodes. A single lock manager thread or instance to manage the required resource is only migrated; other resource locks are still managed at the original lock manager. This allows load distribution and can lower lock request and resource acquisition latency.

A second embodiment of the invention provides a method and system to reduce lock latency and network traffic by migrating lock managers to coupling facility locations closest to nodes seeking resource access. A multiple processing architecture may comprise a plurality of distributed computer systems and one or more coupling facilities. Each of the computer systems is connected to one of the coupling facilities, which receive data from and transmit data to the computer systems.

For example, one group of computer systems may be located in a datacenter in New York, and a second group of computer systems may be located in a datacenter in Los Angeles. The New York systems may be connected to a first coupling facility, the Los Angeles computer systems may be connected to a second coupling facility, and the two coupling facilities may be connected together to transmit data and information between the New York computer systems and the Los Angeles systems.

If the computer systems in New York need to access a resource in Los Angeles, the New York systems seek the lock stored in the Los Angeles coupling facility. This may cause excessive lock latency and higher network link bandwidth. To address this, a thread in the lock manager in the Los Angeles datacenter is migrated to the coupling facility in the New York datacenter. The computer systems in New York can then access the lock manager in the New York coupling facility. This reduces lock latency and reduces bandwidth over the cross-country link and in the Los Angeles datacenter. Such migration is prudent because none of the Los Angeles systems seek access to the resource in Los Angeles. All the systems that seek access to the resource in Los Angeles are in New York.

The present invention is well suited for fine-grained, latency sensitive environments. The release consistency and coherence can be used to preserve latency gains provided by this invention.

The invention relieves burden from the resource manager node. The invention is particularly advantageous when used in a computer system having large node counts and lots of small messages for lock requests. The invention may be used to prevent livelock. Databases like DB2 support row-level locks and systems that host such databases can be subject to a large number of small messages.

Migration of the appropriate instance of the locking function reduces latency to lock, reduces network traffic, and reduces the load on the owner suited.

Migratory locks are useful, for example, when gang scheduled processes share resources, and when there is temporal and spatial locality in resource use. Temporal and spatial locality in resource use may exist when, for instance, resources A, B, C and D are used in a round-robin fashion by processes P1, P2, P3 and P4. Migratory locks are also useful when two processes ping-pong a single semaphore, and when live processes share resource A and resource B.

The preferred embodiments of the invention reduce switch hops to the lock resource manager. This provides many benefits when congested links are present as congested links add to latency. Large diameter networks are especially benefited by this invention.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIG. 4 shows a client resource indirection table and a home NAD resource mapping table that are used in the preferred embodiment of the invention.

DETAILED DESCRIPTION OF THE PREFERRED EMBODIMENTS

Figure 1:
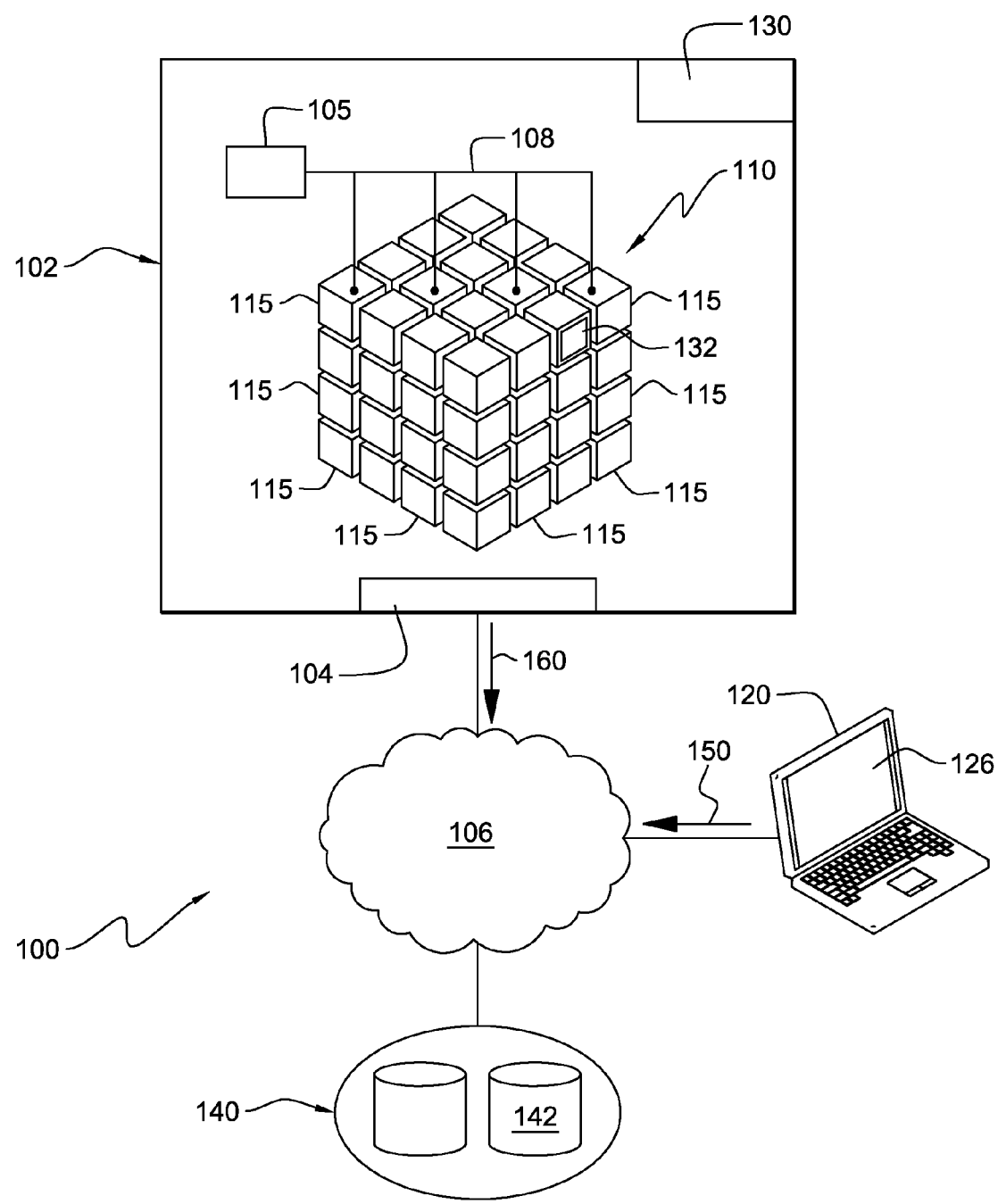
FIG. 1 illustrates an example high performance computing (HPC) system in which the present invention may be practiced.

FIG. 1 is a block diagram illustrating a HPC system 100 for executing software applications and processes, for example an atmospheric, weather, or crash simulation, using HPC techniques. System 100 provides users with HPC functionality dynamically allocated among various computing nodes 115 with I/O performance substantially similar to the processing performance. Generally, these nodes 115 are easily scalable because of, among other things, this increased I/O performance and reduced fabric latency.

HPC system 100 is a distributed client/server system that allows users (such as scientists and engineers) to submit jobs 150 for processing on an HPC server 102. For example, system 100 may include HPC server 102 that is connected, through network 106, to one or more administration workstations or local clients 120. But system 100 may be a standalone computing environment or any other suitable environment. In short, system 100 may be any HPC computing environment that includes highly scalable nodes 115 and allows the user to submit jobs 150, dynamically allocates scaleable nodes 115 for job 150, and automatically executes job 150 using the allocated nodes 115. Job 150 may be any batch or online job operable to be processed using HPC techniques and submitted by any apt user. For example, job 150 may be a request for a simulation, a model, or for any other high-performance requirement. Job 150 may also be a request to run a data center application, such as a clustered database, an online transaction processing system, or a clustered application server. The term "dynamically," as used herein, generally means that certain processing is determined, at least in part, at run-time based on one or more variables. The term "automatically," as used herein, generally means that the appropriate processing is substantially performed by at least part of HPC system 100. It should be understood that "automatically" further contemplates any suitable user or administrator interaction with system 100 without departing from the scope of this invention.

HPC server 102 may comprise any local or remote computer operable to process job 150 using a plurality of balanced nodes 115 and cluster management engine 130. Generally, HPC server 102 comprises a distributed computer such as a blade server or other distributed server. However the configuration, server 102 includes a plurality of nodes 115. Nodes 115 comprise any computer or processing device such as, for example, blades, general-purpose personal computers (PC), Macintoshes, workstations, Unix-based computers, or any other suitable devices. Generally, FIG. 1 provides merely one example of computers that may be used with the invention. For example, although FIG. 1 illustrates one server 102 that may be used with the invention, system 100 can be implemented using computers other than servers, as well as a server pool. The present invention may be used with computers other than general-purpose computers as well as computers without conventional operating systems (OSs). As used herein, the term "computer" is intended to encompass a personal computer, workstation, network computer, or any other suitable processing device. HPC server 102, or the component nodes 115, may be adapted to execute any OS including Linux, UNIX, Windows Server, or any other suitable OS. According to one embodiment, HPC server 102 may also include or be communicably coupled with a remote web server. Therefore, server 102 may comprise any computer with software and/or hardware in any combination suitable to dynamically allocate nodes 115 to process HPC job 150.

At a high level, HPC server 102 includes a management node 105, a grid 110 comprising a plurality of nodes 115, and cluster management engine 130. More specifically, server 102 may include a plurality of blades (nodes 115) with some or all of the following components: i) dual-processors; ii) large, high bandwidth memory; iii) dual host channel adapters (HCAs); iv) integrated fabric switching; v) FPGA support; and vi) redundant power inputs or N+1 power supplies. These various components allow for failures to be confined to the node level. But it will be understood that HPC server 102 and nodes 115 may not include all of these components.

Management node 105 comprises at least one blade substantially dedicated to managing or assisting an administrator. For example, management node 105 may comprise two blades, with one of the two blades being redundant (such as an active/passive configuration). In one embodiment, management node 105 may be the same type of blade or computing device as HPC nodes 115. But, management node 105 may be any node, including any number of circuits and configured in any suitable fashion, so long as it remains operable to at least partially manage grid 110. Often, management node 105 is physically or logically separated from the plurality of HPC nodes 115, jointly represented in grid 110. In the illustrated embodiment, management node 105 may be communicably coupled to grid 110 via link 108. Reference to a "link" encompasses any appropriate communication conduit implementing any appropriate communications protocol. As an example and not by way of limitation, a link may include one or more wires in one or more circuit boards, one or more internal or external buses, one or more local area networks (LANs), one or more metropolitan area networks (MANs), one or more wide area networks (WANs), one or more portions of the Internet, or a combination of two or more such links, where appropriate. In one embodiment, link 108 provides Gigabit or 10 Gigabit Ethernet communications between management node 105 and grid 110.

Grid 110 is a group of nodes 115 interconnected for increased processing power. Typically, grid 110 is a 3D Torus, but it may be a mesh, a hypercube, or any other shape or configuration without departing from the scope of this invention. Reference to a "torus" may encompass all or a portion of grid 110, where appropriate, and vice versa, where appropriate. The links between nodes 115 in grid 110 may be serial or parallel analog links, digital links, or any other type of link that can convey electrical or electromagnetic signals such as, for example, fiber or copper. Each node 115 is configured with an integrated switch. This allows node 115 to more easily be the basic construct for the 3D Torus and helps minimize XYZ distances between other nodes 115. Further, this may make copper wiring work in larger systems at up to Gigabit rates with, in some embodiments, the longest cable being less than 5 meters. Node 115 may be generally optimized for nearest-neighbor communications and increased I/O bandwidth.

Each node 115 may include a cluster agent 132 communicably coupled with cluster management engine 130. Generally, agent 132 receives requests or commands from management node 105 and/or cluster management engine 130. Agent 132 could include any hardware, software, firmware, or combination thereof operable to determine the physical status of node 115 and communicate the processed data, such as through a "heartbeat," to management node 105. In another embodiment, management node 105 may periodically poll agent 132 to determine the status of the associated node 115. Agent 132 may be written in any appropriate computer language such as, for example, C, C++, Assembler, Java, Visual Basic, and others or any combination thereof so long as it remains compatible with at least a portion of cluster management engine 130.

Cluster management engine 130 could include any hardware, software, firmware, or combination thereof operable to dynamically allocate and manage nodes 115 and execute job 150 using nodes 115. For example, cluster management engine 130 may be written or described in any appropriate computer language including C, C++, Java, Visual Basic, assembler, any suitable version of 4GL, and others or any combination thereof. It will be understood that while cluster management engine 130 is illustrated in FIG. 1 as a single multi-tasked module, the features and functionality performed by this engine may be performed by multiple modules such as, for example, a physical layer module, a virtual layer module, a job scheduler, and a presentation engine. Further, while illustrated as external to management node 105, management node 105 typically executes one or more processes associated with cluster management engine 130 and may store cluster management engine 130. Moreover, cluster management engine 130 may be a child or sub-module of another software module without departing from the scope of this invention. Therefore, cluster management engine 130 comprises one or more software modules operable to intelligently manage nodes 115 and jobs 150. In particular embodiments, cluster management engine includes a scheduler for allocating nodes 115 to jobs 150. The Scheduler may use a scheduling algorithm to allocate nodes 115 to jobs 150.

Server 102 may include interface 104 for communicating with other computer systems, such as client 120, over network 106 in a client-server or other distributed environment. In certain embodiments, server 102 receives jobs 150 or job policies from network 106 for storage in disk farm 140. Disk farm 140 may also be attached directly to the computational array using the same wideband interfaces that interconnects the nodes. Generally, interface 104 comprises logic encoded in software and/or hardware in a suitable combination and operable to communicate with network 106. More specifically, interface 104 may comprise software supporting one or more communications protocols associated with communications network 106 or hardware operable to communicate physical signals.

Network 106 facilitates wireless or wireline communication between computer server 102 and any other computer, such as clients 120. Indeed, while illustrated as residing between server 102 and client 120, network 106 may also reside between various nodes 115 without departing from the scope of the invention. In general, network 106 encompasses any network, networks, or sub-network operable to facilitate communications between various computing components. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

In general, disk farm 140 is any memory, database or storage area network (SAN) for storing jobs 150, profiles, boot images, or other HPC information. According to the illustrated embodiment, disk farm 140 includes one or more storage clients 142. Disk farm 140 may process and route data packets according to any of a Number of communication protocols, for example, InfiniBand (IB), Gigabit Ethernet (GE), or FibreChannel (FC). Data packets are typically used to transport data within disk farm 140. A data packet may include a header that has a source identifier and a destination identifier. The source identifier, for example a source address, identifies the transmitter of information, and the destination identifier, for example a destination address, identifies the recipient of the information.

Client 120 is any device operable to present the user with a job submission screen or administration via a graphical user interface (GUI) 126. At a high level, illustrated client 120 includes at least GUI 126 and comprises an electronic computing device operable to receive, transmit, process and store any appropriate data associated with system 100. It will be understood that there may be any Number of clients 120 communicably coupled to server 102. Further, "client 120" and "user of client 120" may be used interchangeably as appropriate without departing from the scope of this disclosure. Moreover, for ease of illustration, each client is described in terms of being used by one user. But this disclosure contemplates that many users may use one computer to communicate jobs 150 using the same GUI 126.

As used herein, client 120 is intended to encompass a personal computer, touch screen terminal, workstation, network computer, kiosk, wireless data port, cell phone, personal data assistant (PDA), one or more processors within these or other devices, or any other suitable processing device. For example, client 120 may comprise a computer that includes an input device, such as a keypad, touch screen, mouse, or other device that can accept information, and an output device that conveys information associated with the operation of server 102 or clients 120, including digital data, visual information, or GUI 126. Both the input device and output device may include fixed or removable storage media such as a magnetic computer disk, CD-ROM, or other suitable media to both receive input from and provide output to users of clients 120 through the administration and job submission display, namely GUI 126.

GUI 126 comprises a graphical user interface operable to allow i) the user of client 120 to interface with system 100 to submit one or more jobs 150; and/or ii) the system (or network) administrator using client 120 to interface with system 100 for any suitable supervisory purpose. Generally, GUI 126 provides the user of client 120 with an efficient and user-friendly presentation of data provided by HPC system 100. GUI 126 may comprise a plurality of customizable frames or views having interactive fields, pull-down lists, and buttons operated by the user. In one embodiment, GUI 126 presents a job submission display that presents the various job parameter fields and receives commands from the user of client 120 via one of the input devices. GUI 126 may, alternatively or in combination, present the physical and logical status of nodes 115 to the system administrator, and receive various commands from the administrator. Administrator commands may include marking nodes as (un)available, shutting down nodes for maintenance, rebooting nodes, or any other suitable command. Moreover, it should be understood that the term graphical user interface may be used in the singular or in the plural to describe one or more graphical user interfaces and each of the displays of a particular graphical user interface. Therefore, GUI 126 contemplates any graphical user interface, such as a generic web browser, that processes information in system 100 and efficiently presents the results to the user. Server 102 can accept data from client 120 via the web browser (e.g., Microsoft Internet Explorer or Netscape Navigator) and return the appropriate HTML or XML responses using network 106.

In one aspect of operation, HPC server 102 is first initialized or booted. During this process, cluster management engine 130 determines the existence, state, location, and/or other characteristics of nodes 115 in grid 110. As described above, this may be based on a "heartbeat" communicated upon each node's initialization or upon near immediate polling by management node 105. Next, cluster management engine 130 may dynamically allocate various portions of grid 110 to one or more virtual clusters based on, for example, predetermined policies. In one embodiment, cluster management engine 130 continuously monitors nodes 115 for possible failure and, upon determining that one of the nodes 115 failed, effectively managing the failure using any of a variety of recovery techniques. Cluster management engine 130 may also manage and provide a unique execution environment for each allocated node of virtual cluster. The execution environment may be comprised of the hostname, IP address, OS, configured services, local and shared file systems, and a set of installed applications and data. The cluster management engine 130 may dynamically add or subtract nodes from each virtual cluster according to associated policies and according to inter-cluster policies, such as priority.

When a user logs on to client 120, he may be presented with a job submission screen via GUI 126. Once the user has entered the job parameters and submitted job 150, cluster management engine 130 processes the job submission, the related parameters, and any predetermined policies associated with job 150, the user, or the user group. Cluster management engine 130 then determines the appropriate virtual cluster based, at least in part, on this information. Engine 130 then dynamically allocates a job space within virtual cluster and executes job 150 across the allocated nodes 115 using HPC techniques. Based, at least in part, on the increased I/O performance, HPC server 102 may more quickly complete processing of job 150. Upon completion, cluster management engine communicates results 160 to the user.

Figure 2:
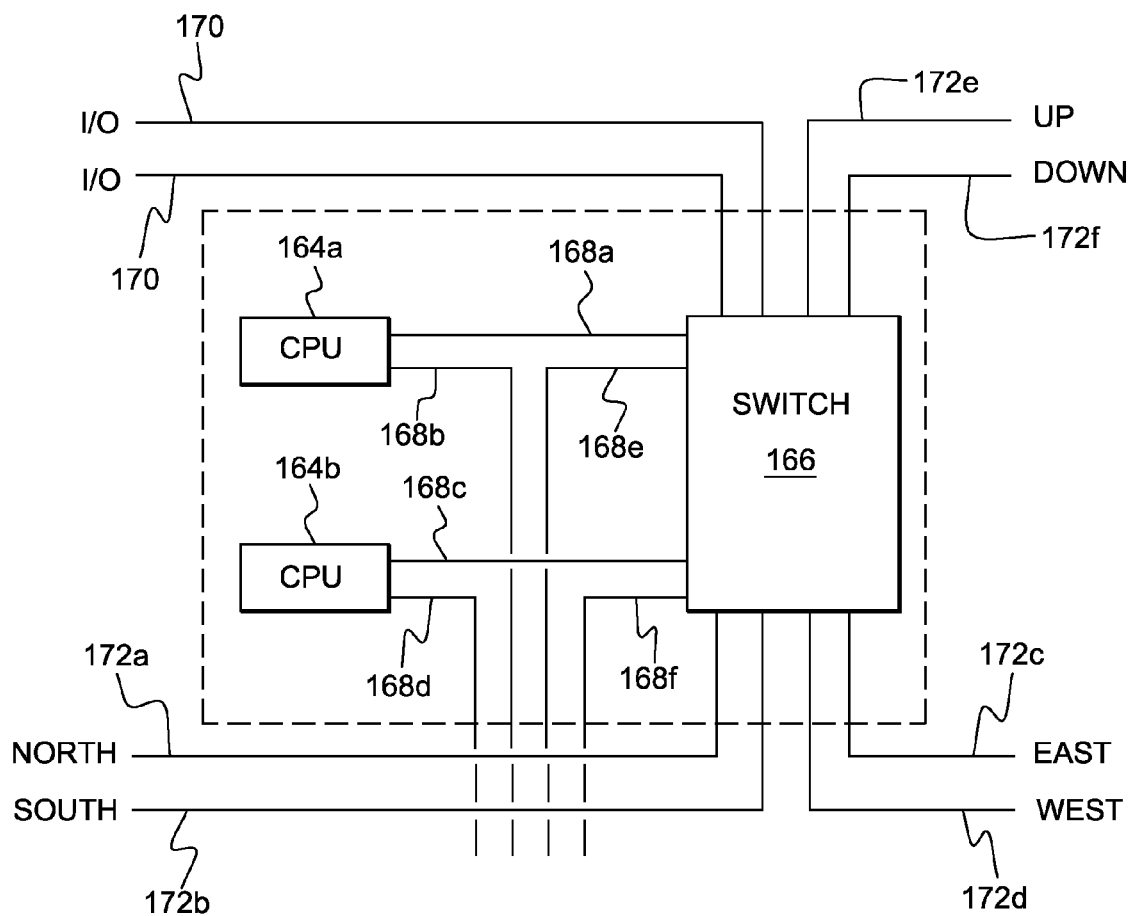
FIG. 2 shows an example node of the HPC system of FIG. 1.

FIG. 2 illustrates an example node (or blade) 115. A node 115 includes any computing device in any orientation for processing all or a portion, such as a thread or process, of one or more jobs 150. As an example and not by way of limitation, a node 115 may include a XEON motherboard, an OPTERON motherboard, or other computing device. Node 115 has an architecture providing an integrated fabric that enables distribution of switching functionality across nodes 115 in grid 110. In particular embodiments, distributing such functionality across nodes 115 in grid 110 may obviate centralized switching in grid 110, which may in turn increase fault tolerance in grid 110 and enable parallel communication among nodes 115 in grid 110.

As shown in FIG. 2, node 115 includes two CPUs 164 and a switch (or fabric) 166. Alternatively, a node 115 may include one CPU 164, where appropriate. Switch 166 may be an integrated switch. In particular embodiments, switch 166 has multiple ports. Two ports on switch 166 may couple node 115 to management node 105 for input and output to and from node 115. In addition, two ports on switch 166 may each couple node 115 to another node 115 along an x axis of grid 110, two ports on switch 166 may each couple node 115 to another node 115 along a y axis of grid 110, and two ports on switch 166 may each couple node 115 to another node 115 along a z axis of grid 110 to facilitate implementation of a 3D mesh, a 3D torus, or other topology in grid 110. Additional ports on switch 166 may couple node 115 to other nodes 115 in grid 110 to facilitate implementation of a multidimensional topology (such as a 4D torus or other nontraditional topology including more than three dimensions) in grid 110. In particular embodiments, one or more ports on switch 166 may couple node 115 to one or more other nodes 115 along one or more diagonal axes of grid 110, which may reduce communication jumps or hops between node 115 and one or more other node 115 relatively distant from node 115. As an example and not by way of limitation, a port on switch 166 may couple node 115 to another node residing along a northeasterly axis of grid 110 several 3D jumps away from node 115. In particular embodiments, switch 166 is an InfiniBand switch. Although a particular switch 166 is illustrated and described, the present invention contemplates any suitable switch 166.

Link 168*a* couples CPU 164*a* to switch 166. Link 168*b* couples CPU 164*a* to another switch 166 in another node 115. Link 168*c* couples CPU 164*b* to switch 166. Link 168*d* couples CPU 164*b* to another switch 166. Links 168*e* and 168*f* couple switch 166 to two other CPUs 164 in other node 115. In particular embodiments, a link 168 includes an InfiniBand 4.times. link capable of communicating approximately one gigabyte per second in each direction. Although particular links 168 are illustrated and described, the present invention contemplates any suitable links 168. Links 170 are I/O links to node 115. A link 170 also may include an InfiniBand 4.times. link capable of communicating approximately one gigabyte per second in each direction. Although particular links 170 are illustrated and described, the present invention contemplates any suitable links 170. Links 172 couple switch 166 to other switches 166 in other nodes 115, as described below. In particular embodiments, a link 172 includes an InfiniBand 12.times.link capable of communicating approximately three gigabytes per second in each direction. Although particular links 172 are illustrated and described, the present invention contemplates any suitable links 172.

It may be noted that nodes are described herein as performing actions and as being the object of actions. However, this is just a convenient way of expressing that one or more processes on a node are performing an action or is the object of an action. For example, a node accessing a shared resource or granting, holding, or being issued a lock is just a convenient way of expressing that a process on the node is accessing a shared resource or granting, holding, or being issued a lock.

Multiple processes running on system 100 access shared resources. Some of these shared resources may be accessed by only one process at a time, while others may be accessed concurrently by multiple processes. Consequently, system 100 employs a synchronization mechanism to control access by multiple processes to shared resources. The synchronization mechanism grants locks to processes. Locks grant to holders of the locks the right to access a particular resource in a particular way. Once a lock is granted to a process, the process holds or owns the lock until the lock is relinquished, revoked, or otherwise terminated. Locks are represented by data structures such as semaphores, read/write latches, and condition variables. There are many types of locks. Some types of locks allow shared resources to be shared by many processes concurrently (e.g. shared read locks), while other types of locks prevent any type of lock from being granted on the same resource (exclusive write locks). The entity responsible for granting locks is referred to herein as a lock manager.

Figure 3:
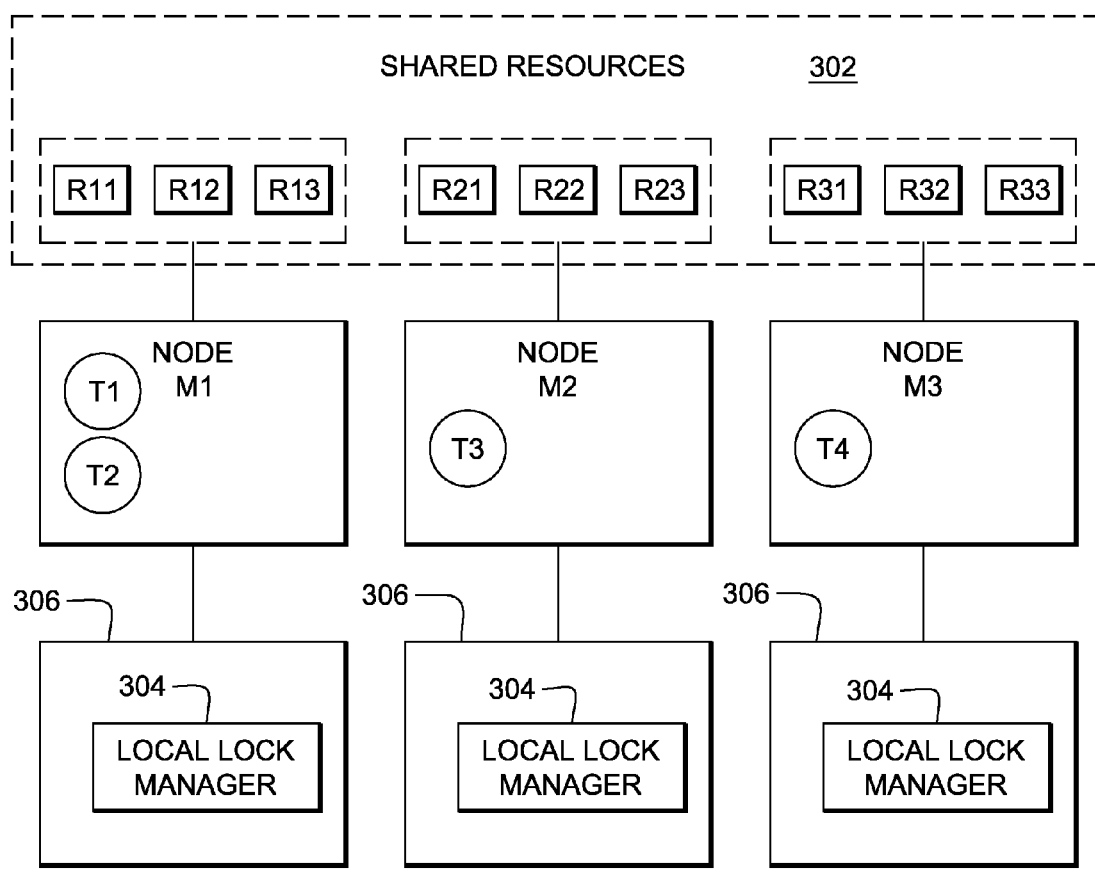
FIG. 3 illustrates three nodes and a set of shared resources of the HPC system of FIG. 1.

FIG. 3 illustrates shared resources in system 100 of FIG. 1. More specifically, FIG. 3 shows three nodes M1, M2 and M3 of system 100, and these nodes access shared resources 302. As shown in FIG. 3, a lock manager 304 runs directly on the network attached device (NAD) 306 to offload lock requests from the compute processors.

Shared resources can be any kind of computer resource, including volatile and non-volatile memory, input/output peripheral devices, and data stored in non-volatile or volatile memory (e.g. database data blocks, a file or portion thereof, buffers in memory that hold such data). Access to shared resources by nodes M1, M2, and M3 is controlled by a global synchronization mechanism that includes a local lock manager 304 on each of nodes M1, M2, and M3.

Each of nodes M1, M2, and M3 are assigned as masters to a subset of shared resources 302. With the example illustrated in FIG. 3, node M1 is the master of shared resources R11, R12, and R13, node M2 is the master of shared resources R21, R22, and R23, and node M3 is the master of shared resources R31, R32, and R33. Shared resources to which access is governed by a master node are referred to as being mastered by that node.

In the operation of system 100, there is usually temporal locality in resource usage, and for example, gang scheduled processes demonstrate such locality. As an example, tasks T1, T2, T3, T4 on nodes M1, M2 and M3 access resources R1, R12, R21 and R31. T1 acquires, for example, a lock on R11, then R12, R21 and finally R31. T2, T3, T4 also compete for access to R11, R12, R21 and R31. A network-attached device can be used as a lock manager to offload lock request from the server machine. In one embodiment of the invention, a network device is used to offload lock management tasks from the resource owner compute node. In addition, if temporal locality in resource usage is noticed, a lock manager thread may be migrated to a NAD location that is equidistant from all participating compute nodes. A single lock manager thread to manage the required resource is only migrated, for other resources, locks are still managed at the original lock manager. This allows load distribution and can lower lock request and resource acquisition latency.

Each NAD has a process, memory, storage and IP network link. The NADs are used to offload lock access and grant to a simple device externally attached to a switch or router node.

In a preferred embodiment, an NAD is attached to all of the nodes in the network. The NAD attached to the home switch is responsible for local server activity. For resource accesses that exhibit temporal locality, the lock access and grant activity is moved to a switch location NAD equidistant from all the competing tasks so that the overall resource access latency is lowered. This can lower execution time in a distributed computation. The home switch can migrate a lock manager thread for one resource or a combination of resources. The home switch has a resource indirection table that can forward lock requests to the current mobile lock manager.

The home switch uses two policies for lock manager migration. The lock manager can detect temporal locality in resource access for a single resource or a combination of resources during run-time. The lock manager records tasks that access the resource along with timestamps. A graph is built in memory and when sufficient accesses are noticed, a lock manager thread is migrated to an equidistant mobile lock manager NAD. Also, gang scheduled processes can proactively request an equidistant mobile NAD to process lock requests that exhibit temporal locality. A flowchart for operation of this policy is shown in FIG. 6(*b*).

In the second policy, a set of processes can create a lock manager thread for a single resource or a combination of resources. This may be programmer defined at compile-time. The programmer preferably uses an API and middleware layer to instantiate a lock manager thread that can minimize latency by equidistant location positioning. Similarly, compiler support can be used to specify locations where lock manager instances can be placed to increase network utilization. The compiler can extract this information from the program or a programmer can specify "hints" to the compiler. A flowchart for operation of this policy is shown in FIG. 6(*a*).

For example, hop count or latency may be used as a metric for placement of the mobile lock manager NAD. Congestion and reliability can also be used as metrics for placement of the mobile lock manager thread. The home lock manager may use global information regarding reliable and congested links to make this decision.

It will be understood that the present invention is supported for the "direct" network of FIG. 1, where a switch is present in every node. Here a NAD can be attached to the switch 166 of FIG. 2. In the "indirect" network of FIG. 5, the switch attached to the home node or owner of the resource is the home switch. A NAD is attached to the home switch to offload lock requests from the owner compute node. In an indirect network, switches may be attached to other switches without connecting to other compute nodes. In this case, NADs can be attached to the aforementioned switch types also with lock manager instances migrating to these NADs as well.

In this embodiment of the invention, an owner node has the resource. With reference to FIG. 4, all clients have a resource indirection table 402, which includes informative for resource id to switch id mapping i.e. tells the client, which switch or NAD it must contact to request access to a particular resource. This table may include or identify a resource id 402a, a home switch address/id 402b, and a mobile switch address/id 402c. The home switch attached to the owner node has a NAD with resource mapping table 404. This table may include or identify a resource id 404a, the current resource owner 404b and the resource manager location 404c. The home switch may also have a linked list 404d of waiting nodes (last N requests, where N can be set by the application user).

Requests from clients are acknowledged by the resource manager attached to the home switch. These requesters know the new switch location where the instance of the resource manager newly resides by way of the acknowledgement. A client requester can cancel a request if it so wishes. Resources with resource manager in the process of migrating have their locations in the "home switch" with a blank entry.

Figure 5:
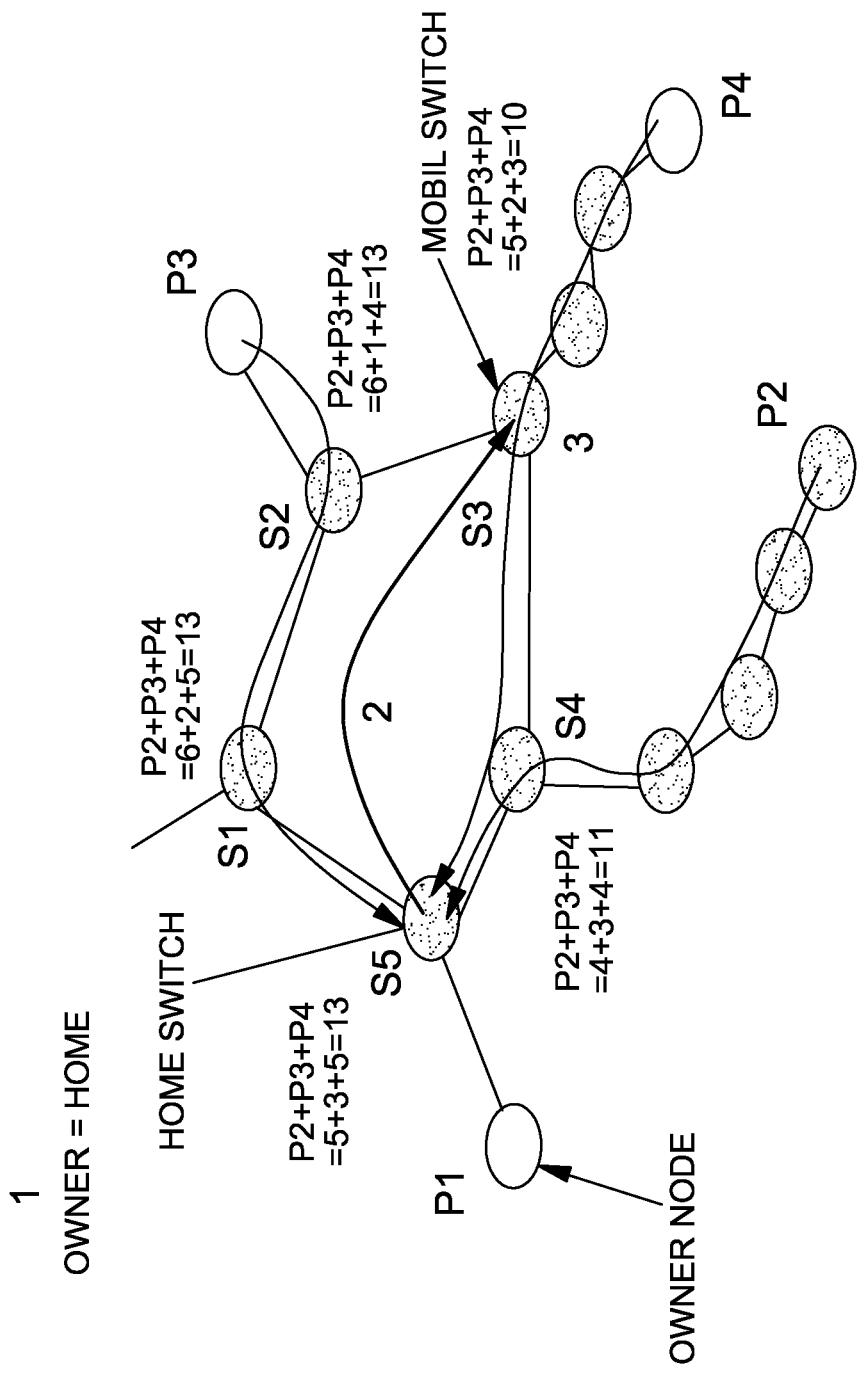
FIG. 5 illustrates a procedure for selecting the location to where a lock manager is moved.

FIG. 5 illustrates an example of migratory locks. FIG. 5 shows a set of nodes P1, P2, P3 and P4, and a set of switches S1, S2, S3, S4 and S5. In this example, S5 is the home switch for a particular resource, and nodes P2, P3 and P4 request access to that resource. The lock management function for that resource is moved to the NAD attached to the switch having the minimum total distance (as measured by an appropriate metric, in this case hop count) to those requesting nodes P2, P3 and P4. As shown in FIG. 5, in this example, switches S1, S2 and S3 have, respectively, total distances from the requesting nodes of 13, 13 and 10; and switches S4 and S5 have total distances from these requesting nodes of 11 and 15 respectively. Accordingly, lock management for the requested resource is moved from S5 to the NAD attached to S3 as it has the lowest aggregate hop count.

This example uses aggregation of latency on hops as a metric to measure distances between node and the NAD to which the lock is migrated. Other metrics such as average or mean latency or hop count from the requesting clients to each candidate node/switch could be used. Also, weighted hops could be used. This metric would favor tasks with higher priority. Switch node metrics may be considered where the task with high priority has the lowest hop count. The weighted average of each path from the requesters to each candidate node could also be used as a metric. It will be understood that the latency or distance in "hops" from a requesting client to each candidate switch is the shortest path from the requester to each candidate switch of FIG. 5.

Other metrics that may be used for lock migration may be based on the reliability of links (appropriate weights may be given for links to reflect the congested state of the network or their relative reliability). In addition, it should be noted that the present invention may be practiced where a switch is not necessarily attached to each node, i.e., a node is simply a processor but may be connected to a network where switches are connected to each other. This is an indirect network. The lock manager cold be moved to a switch and this switch could be connected to other switches and not necessarily other processor nodes.

Figure 6A:
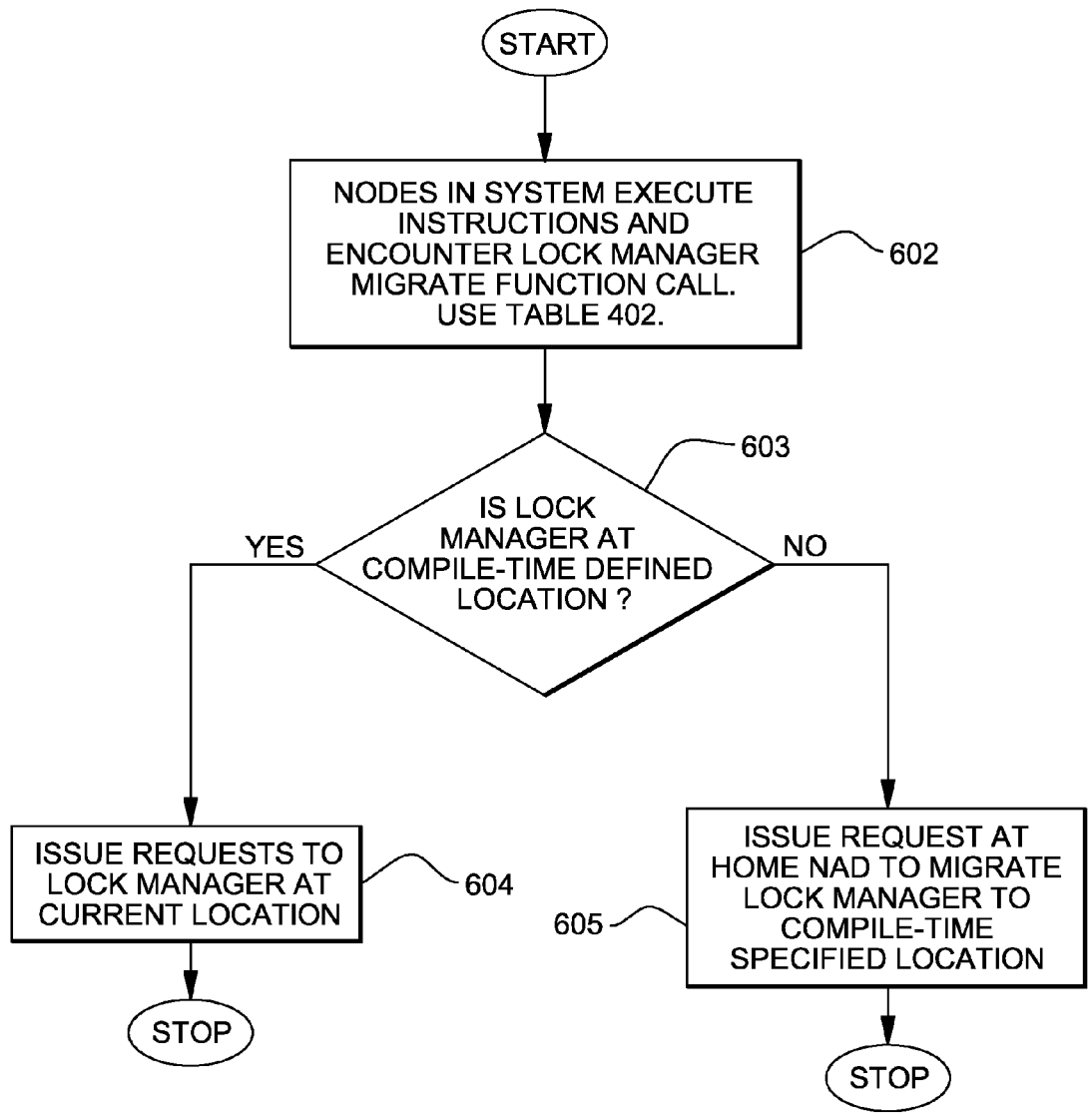
FIG. 6a shows a flowchart for compile-time specification of resource migration.

FIG. 6(a) shows a flowchart for compile-time specification of resource migration. At step 602, nodes execute instructions and encounter a request to migrate a lock manager to a particular NAD or switch address/id. A node first checks if the lock manager is at the compile-time specified location at step 603. If yes, the node simply issues lock requests to this location at step 604. This means that another node encountered the migration request earlier and already completed the migration. If a node is first to reach the explicit migration request, at step 603, it does not find the lock manager at the compile-time specified location. At step 605, it issues a request to the home NAD for a lock and also explicitly requests migration of the lock manager using client table 402 and the compile-time specified location. Execution then transfers control to step 602.

Figure 6B:
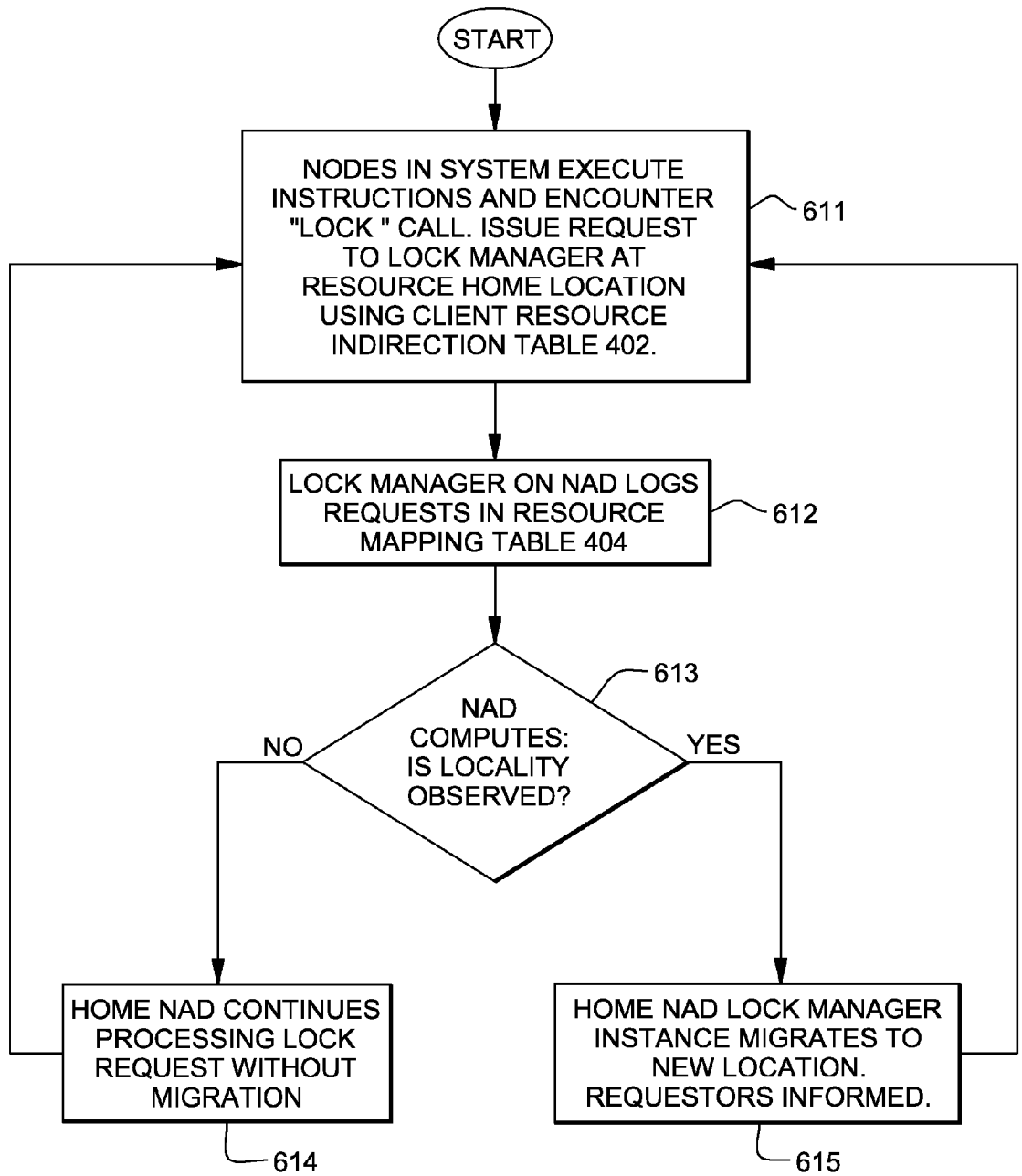
FIG. 6b shows a flowchart for run-time detection of resource migration.

FIG. 6(b) shows a flowchart for run-time detection of resource migration. At step 611, nodes make lock requests for a particular resource using client resource indirection table 402. At step 612, home NAD lock manager stores lock requests from various nodes in resource mapping table 404. At step 613, if the home NAD lock manager detects locality, it moves an instance of the lock manager to handle lock requests for a particular resource to a new mobile NAD location. All requesting nodes are informed of this location change so that they can update client resource tables 402. If locality is not detected at step 613, migration is not performed and the home NAD continues processing lock requests at step 614.

Figure 7:
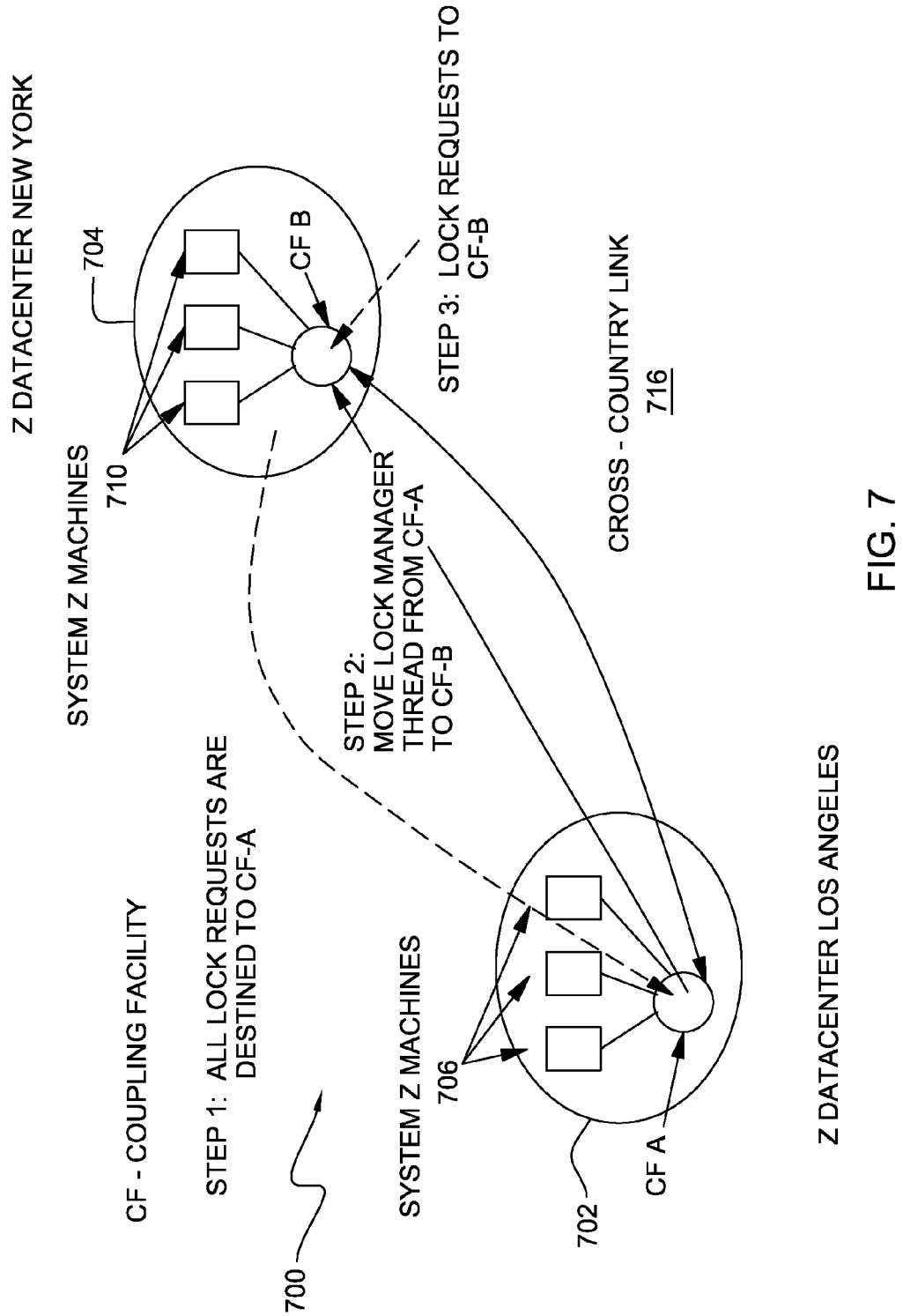
FIG. 7 depicts a multiple processing architecture in which a lock manager thread is migrated from one area to another area.

A second embodiment of the invention provides a method and system to reduce lock latency and network traffic by migrating lock managers to coupling facility locations closest to nodes seeking resource access. FIG. 7 illustrates a computing network using this embodiment of the invention.

More specifically, FIG. 7 depicts a computer network 500, which includes two data centers 702 and 704, which for example, may be in Los Angeles and New York respectively. Data center 702 includes a group of computer systems or complexes 706 coupled to coupling facility CF A, and data center 704 includes a group of computer systems or complexes 710 coupled to a coupling facility CF B. For example, each of the computer systems 706 and 710 may run an instance of the z/OS Operating System offered by International Business Machines Corporation, Armonk, N.Y. In general, though, computers of any suitable architecture can be used as computer systems or complexes 706 and 710. Each of the computer systems 706 and 710 operates to execute one or more processes that may share data and resources with one or more of the other computer systems. The sharing of data and resources by two or more processes is carried out through operation of the coupling facilities CF A and CF B.

A CF-to-CF connection 716 (e.g., a peer connection), such as an Intersystem Channel (ISC) link, couples the two coupling facilities. The peer ISC link can transmit both primary message commands and secondary message commands in either direction. This may be physically represented by either two unidirectional links, one with a sender channel on the primary coupling facility and a receiver channel on the secondary coupling facility, and the second link oppositely configured. This may also be represented by a single physical link where the channel interface in each coupling facility supports both sender and receiver functionality. This latter capability exists in ISC3 links and their variants: ICB3 and IC3, all of which are offered by International Business Machines Corporation, Armonk, N.Y.

The peer ISC link between the coupling facilities is used, for instance, to exchange message path commands on the primary message command interface to configure and couple the two coupling facilities. Once configured and coupled, the peer ISC link is also used to send secondary commands of the list-notification type to exchange signals as part of a signaling protocol for duplexed command execution. The sending and receiving of these secondary commands is managed by a coupling facility component called a signaling protocol engine.

In the operation of network 500, machines 506 and 510 can access shared distributed resources by gaining access to resource locks stored in coupling facilities CF A and CF B. If machines in the NY datacenter 504 need access to a resource in the LA datacenter 502, then those NY machines will access a lock stored in CF A across the cross-country link. This causes network traffic across the cross-country link and in the LA datacenter. In accordance with an embodiment of the invention, lock latency and network traffic is reduced by migrating lock managers to coupling facility locations closest to nodes seeking resource access.

For instance, if systems 710 in NY need to access a resource in LA, those NY systems would seek the lock stored in CF A. This causes excessive lock latency and higher network link bandwidth. With an embodiment of the invention, a thread in the lock manager is migrated to the New York datacenter. The systems 710 in New York can then access the lock manager thread in CF B. This is possible because only systems in the NY datacenter seek access to the resource in LA datacenter 702. This reduces lock latency and reduces bandwidth over the cross-country link and in the LA datacenter. If systems in LA seek access to the same resource, then "weights" and "priorities" can be used to determine the datacenter where the lock manager instance or thread should be run as shown in FIG. 5. The location of the lock manager thread would be optimized to cumulatively enhance the lock access performance of datacenter NY 704 and datacenter LA 702 simultaneously.

As will be readily apparent to those skilled in the art, the present invention, or aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of migrating network resources to improve network utilization, for use in a multi-node network wherein nodes of the network share network resources, the method comprising the steps of:
   identifying a group of nodes that share one of the network resources;
   for each of a plurality of the nodes of the multi-node network, determining an associated aggregate access latency time, based on at least one defined access latency metric, indicating an aggregate latency time for requests from the nodes of said group of nodes, in aggregate, to reach said each node of said plurality of nodes;
   identifying one of the nodes from the multi-node network based on said aggregate access latency times;
   moving said shared resource to a location in the network based on the identified one of the nodes; and after moving said shared resource to said location, directing requests from said group of nodes for the shared resource to the identified one of the nodes to reduce overall aggregate access latency time for said requests from said group of nodes to reach the shared resource.

2. A method according to claim 1, wherein the moving step includes the steps of:
   moving said shared resource from a home node to said identified one of the nodes; and
   said home node forwarding requests for the shared resource to said identified one of the nodes.

3. A method according to claim 2, wherein the step of moving the shared resource from the home node includes the steps of:
   said home node keeping track of the number of accesses to said shared resource;
   when the shared resource is accessed a given number of times, the home node moving said shared resource to said identified one of the nodes;
   providing each of the client nodes with a resource indirection table including information to identify the switch or NAD to contact to request a particular resource; and
   providing the home node with a resource mapping table to identify a resource id, the current resource owner, the resource manager location and list of requesting nodes.

4. A method according to claim 2, wherein the step of moving said shared resource from the home node includes the step of using said home node to move the shared resource to said identified one of the nodes.

5. A method according to claim 1, wherein said defined metric is based on sum of node hop counts from the group of nodes that share the resources to other nodes in the network.

6. A method according to claim 1, wherein said resource migration is based on one of (i) being specified explicitly at compile-time by a programmer or software compiler of the system and (ii) during run-time by implicitly detecting spatial and temporal locality in resource access for a single resource or a combination of resources.

7. A method according to claim 1, wherein:
   the group of nodes are a first group of computers located in a first datacenter;
   said first group of computers access resources owned by a second group of computers located in a second datacenter; and
   the shared resource is a lock manager that manages access to the resources of the second group of computers; and the moving step includes the step of moving the lock manager from the second datacenter to the first datacenter.

8. A method according to claim 7, wherein:
the first group of computers are connected together by a first coupling facility;
the second group of computers are connected together by a second coupling facility; and
the moving step includes the step of moving the lock manager from the second coupling facility to the first coupling facility.

9. A method according to claim 8, wherein the first group of computers access the lock manager on the first coupling facility for access to the resources of the second group of computers in the second datacenter, and the lock manager is moved from the second datacenter to the first datacenter if the only requestors of the lock manager are computers in the first datacenter.

10. A system for migrating network resources to improve network utilization, for use in a multi-node network wherein nodes of the network share network resources, the system comprising:
one or more processing units configured for (i) identifying a group of nodes that share one of the network resources, (ii) for each of a plurality of the nodes of the multi-node network, determining an associated aggregate access latency time, based on at least one defined access latency metric, indicating an aggregate latency time for requests from the nodes of said group of nodes, in aggregate, to reach said each node of said plurality of nodes; (iii) identifying one of the nodes based on said aggregate access latency times, and (iv) moving said shared resource to the identified one of the nodes, and (v) after moving said shared resource to said location, directing requests from said group of nodes for the shared resource to the identified one of the nodes to reduce overall aggregate access latency time for said requests from said group of nodes to reach the shared resource.

11. A system according to claim 10, wherein:
said moving is done by moving said shared resource from a home node to said identified one of the nodes; and
said one or more processor units are further configured for forwarding requests for the shared resource from the home node to said identified one of the nodes.

12. A system according to claim 11, wherein said one or more processor units are further configured for keeping track of the number of accesses to said shared resource at the home node; and when the shared resource is accessed a given number of times at the home node, moving said shared resource to said identified one of the nodes.

13. A system according to claim 10, wherein:
the group of nodes are a first group of computers located in a first datacenter;
said first group of computers are connected together by a first coupling facility at the first datacenter;
said first group of computers access a second group of computers located in a second datacenter;
the second group of computers are connected together by a second coupling facility at the second datacenter;
the shared resource is a lock manager that manages access to other resources of the second group of computers; and one or more processor units are further configured for moving the lock manager from the second coupling facility to the first coupling facility.

14. An article of manufacture comprising a program storage device readable by computer, tangibly embodying a program of instructions executable by the computer to perform method steps for migrating network resources to improve network utilization, for use in a multi-node network wherein nodes of the network share network resources, the method steps comprising:
identifying a group of nodes that share one of the network resources;
for each of a plurality of the nodes of the multi-node network, determining an associated aggregate access latency time, based on at least one defined access latency metric, indicating an aggregate latency time for requests from the nodes of said group of nodes, in aggregate, to reach said each node of said plurality of nodes;
identifying one of the nodes based on said access latency times;
moving said shared resource to the identified one of the nodes; and after moving said shared resource to said location, directing requests from said group of nodes for the shared resource to the identified one of the nodes to reduce overall access latency time for said requests from said group of nodes to reach the shared resource.

15. An article of manufacture according to claim 14, wherein the moving step includes the steps of:
moving said shared resource from a home node to said identified one of the nodes; and
said home node forwarding requests for the shared resource to said identified one of the nodes.

16. An article of manufacture according to claim 14, wherein said defined metric is based on the latency access to the shared resources by said group of nodes.

17. An article of manufacture according to claim 14, wherein said defined metric is based on temporal locality in resource access for a single resource or a combination of resources.

18. The method according to claim 1, wherein:
the determining includes, for each of said plurality of nodes, determining an amount of time, based on said at least one defined latency metric, needed for the requests from each of the nodes of said group of nodes to access reach said each of the nodes of said plurality of nodes, and summing said amounts of time for the requests from all of said nodes of said group of nodes to obtain an associated total access latency time for said each node of said plurality of nodes; and
said identifying includes identifying said one of the nodes based on the associated total access latency times obtained for said plurality of nodes.

19. The method according to claim 18, wherein said identifying includes identifying the one of the nodes having the minimum of the associated total access latency times.

20. The method according to claim 1, wherein:
the aggregate access latency time is based on the distance between each of the group of nodes and each of the plurality of nodes, as measured according to a defined distance metric.

* * * * *